US012569863B2

(12) United States Patent
Kilchyk et al.

(10) Patent No.: US 12,569,863 B2
(45) Date of Patent: Mar. 10, 2026

(54) VARIABLE GEOMETRY NOZZLE UTILIZING MAGNETIC FLUID

(71) Applicant: Hamilton Sundstrand Corporation, Charlotte, NC (US)

(72) Inventors: Viktor Kilchyk, Lancaster, NY (US); Darryl Colson, West Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 343 days.

(21) Appl. No.: 17/851,581

(22) Filed: Jun. 28, 2022

(65) Prior Publication Data

US 2023/0415174 A1 Dec. 28, 2023

(51) Int. Cl.
*B05B 1/12* (2006.01)
*B05B 1/32* (2006.01)

(52) U.S. Cl.
CPC . *B05B 1/12* (2013.01); *B05B 1/32* (2013.01)

(58) Field of Classification Search
CPC .................................... B05B 1/12; B05B 1/32
USPC ................. 239/11, 436, 437, 585.1, DIG. 11
See application file for complete search history.

(56) References Cited

U.S. PATENT DOCUMENTS 2,743,898 A * 5/1956 King, Jr. .................. B01J 8/082 251/129.21
3,279,192 A 10/1966 Hull, Jr. et al.
3,982,722 A 9/1976 Bernard
5,111,992 A 5/1992 Barcza
7,681,863 B1 * 3/2010 Soderlind ........... F16K 31/0668 239/DIG. 11
10,119,412 B2 11/2018 Roberge
10,309,361 B2 * 6/2019 Thibault ............ F02M 63/0007
11,022,230 B2 6/2021 Ohrem et al.
11,293,311 B2 4/2022 Neiser
2009/0072056 A1 * 3/2009 Hasegawa ................. B05B 1/26 239/333

FOREIGN PATENT DOCUMENTS

DE 102008057575 A1 5/2010
EP 2074307 B1 1/2011

OTHER PUBLICATIONS

Abstract for DE102008057575 (A1): Published: May 20, 2010, 1 page.
European Search Report for Application No. 23181852.7, mailed Oct. 24, 2023, 7 pages.
Afridi, et al. "Fluidic Thrust Vectoring in Jet Engine Nozzles", Scholarly Community Encyclopedia, Aug. 10, 2023, Retrieved from: https://encyclopedia.pub/entry/47854, Retrieved on Mar. 28, 2025.

(Continued)

*Primary Examiner* — Steven J Ganey
(74) *Attorney, Agent, or Firm* — CANTOR COLBURN LLP

(57) ABSTRACT

The present disclosure provides variable geometry nozzle or valve assemblies utilizing magnetic fluid (e.g., ferromagnetic fluid; magnetorheological fluid; non-Newtonian magnetic fluid; general viscous magnetic fluid). More particularly, the present disclosure provides variable geometry nozzle or valve assemblies utilizing magnetic fluid for high efficiency expansion and/or mass flow control in fluidic systems (e.g., gas injectors; micro-satellite propulsion systems; gas burners; fluid injectors; etc.).

20 Claims, 6 Drawing Sheets

(56) References Cited

OTHER PUBLICATIONS

Combination Inlet guide Vane and Bleed Valve System, Retrieved from https://navyaviation.tpub.com/14008/Variable-Area-Exhaust-Nozzles-154.html, Retrieved on Mar. 28, 2025, 3 pages.
Deere, Karen A., "Summary of Fluidic Thrust Vectoring Research Conducted at NASA Langley Research Center", The 21st AIAA Applied Aerodynamics Conference, Jun. 23-26, 2003, pp. 1-18.
Ennix, et al. "Flight-Determined Engine Exhaust Characteristics of an F404 Engine in an F-18 Airplane", NASA Technical Memorandum 4538, Oct. 1993, 20 pages.
Frith, Denis "The General Electric F404-Engine of the RAAF's New Fighter", Department of Defence, Defence Science and Technology Organisation Aeronautical Research Laboratories, AR-004-033, Aero Propulsion Technical Memorandum 426, 58 pages Feb. 1986.
Propelling nozzle—Wikipedia, Retrieved from https://en.wikipedia.org/wiki/Propelling_nozzle, Retrieved on Mar. 25, 2025, 9 pages.
Walton, et al. "Exhaust-Gas Pressure and Temperature Survey of F404-GE-400 Turbofan Engine", NASA Technical Memorandum 88273, Dec. 1986, 32 pages.
Wang, et al. "Study of starting Problem of Axisymmetric Divergent Dual Throat Nozzle", Journal of Engineering for Gas Turbines and Power, Jun. 2017, vol. 139/062602-1 to 062602-13; Retrieved from: https://gasturbinespower.asmedigitalcollection.asme.org/ on Sep. 12, 2017.
European Office Action for Application No. 23181852.7, mailed Nov. 6, 2025, 11 pages.

* cited by examiner

VARIABLE GEOMETRY NOZZLE UTILIZING MAGNETIC FLUID

TECHNICAL FIELD

The present disclosure relates to variable geometry nozzle or valve assemblies utilizing magnetic fluid (e.g., ferromagnetic fluid; magnetorheological fluid; non-Newtonian magnetic fluid; general viscous magnetic fluid) and, more particularly to variable geometry nozzle or valve assemblies utilizing magnetic fluid for high efficiency expansion and/or mass flow control in fluidic systems (e.g., gas injectors; micro-satellite propulsion systems; gas burners; fluid injectors; etc.).

BACKGROUND

In general, a variable geometry nozzle is a nozzle with a changeable diameter. A variable geometry nozzle can be in the shape of a convergent nozzle at sub-sonic speeds, and in the shape of a convergent-divergent nozzle at super-sonic speeds. Conventional practice provides that on certain aircraft, only the primary (convergent) nozzle position is controlled. It is noted that variable geometry nozzles have been used for propulsion, and they can allow for flow control. Nozzle geometry can include a throat area that controls flow rate and/or expansion. As such, a properly expanded flow should not have shock waves, which can reduce propulsion. Unlike mechanical thrust vectoring nozzles that use actuated hardware to vector the primary jet thrust, fluidic thrust vectoring nozzles utilize a secondary air stream to manipulate the primary jet flow.

BRIEF DESCRIPTION

The present disclosure provides variable geometry nozzle or valve assemblies utilizing magnetic fluid (e.g., ferromagnetic fluid; magnetorheological fluid; non-Newtonian magnetic fluid; general viscous magnetic fluid). More particularly, the present disclosure provides variable geometry nozzle or valve assemblies utilizing magnetic fluid for high efficiency expansion and/or mass flow control in fluidic systems (e.g., gas injectors; micro-satellite propulsion systems; gas burners; fluid injectors; etc.).

The present disclosure provides for a nozzle assembly including an outer wall and a flexible inner wall defining an enclosed cavity between the outer wall and the flexible inner wall; and a portal of the outer wall for inputting or outputting magnetic fluid to or from the enclosed cavity; wherein when geometric variation of an inner passageway of the nozzle assembly is desired, a magnetic field of two magnet members positioned proximal to the inner passageway is turned off or reduced, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway.

In addition to one or more of the features described, or as an alternative to any of the foregoing embodiments, the magnetic fluid comprises at least one of ferromagnetic fluid, magnetorheological fluid, non-Newtonian magnetic fluid, or a general viscous magnetic fluid.

In addition to one or more of the features described, or as an alternative to any of the foregoing embodiments, the flexible inner wall is fabricated from an elastic material, and wherein the flexible inner wall has a variable thickness along a length of the flexible inner wall.

In addition to one or more of the features described, or as an alternative to any of the foregoing embodiments, a yield stress of the magnetic fluid is controlled by varying an intensity of the magnetic field.

In addition to one or more of the features described, or as an alternative to any of the foregoing embodiments, wherein via deformation of the flexible inner wall, a throat area of the inner passageway closes or opens.

In addition to one or more of the features described, or as an alternative to any of the foregoing embodiments, an outer surface of the flexible inner wall includes a plurality of scales or plates.

In addition to one or more of the features described, or as an alternative to any of the foregoing embodiments, the plurality of scales or plates are embedded in an elastic material of the flexible inner wall.

In addition to one or more of the features described, or as an alternative to any of the foregoing embodiments, the flexible inner wall includes a flexible cover sleeve fabricated from abrasion-resistant material, the flexible cover sleeve positioned around or on the flexible inner wall.

In addition to one or more of the features described, or as an alternative to any of the foregoing embodiments, the flexible inner wall is fabricated from a wear resistant flexible material having embedded or molded-in reinforcing fibers.

In addition to one or more of the features described, or as an alternative to any of the foregoing embodiments, wherein deformation of the flexible inner wall is non-symmetrically around the inner passageway.

In addition to one or more of the features described, or as an alternative to any of the foregoing embodiments, the nozzle assembly is a micro-satellite propulsion assembly.

In addition to one or more of the features described, or as an alternative to any of the foregoing embodiments, the nozzle assembly is a fluid injector or a gas burner assembly.

The present disclosure provides for a valve assembly including an outer wall and a flexible inner wall defining an enclosed cavity between the outer wall and the flexible inner wall; and a portal of the outer wall for inputting or outputting magnetic fluid to or from the enclosed cavity; and wherein when geometric variation of an inner passageway of the nozzle assembly is desired, a magnetic field of two magnet members positioned proximal to the inner passageway is turned off or reduced, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway or relative to a valve positioned in the inner passageway.

In addition to one or more of the features described, or as an alternative to any of the foregoing embodiments, the magnetic fluid comprises at least one of ferromagnetic fluid, magnetorheological fluid, non-Newtonian magnetic fluid, or a general viscous magnetic fluid.

In addition to one or more of the features described, or as an alternative to any of the foregoing embodiments, the flexible inner wall is fabricated from an elastic material, and wherein the flexible inner wall has a variable thickness along a length of the flexible inner wall.

In addition to one or more of the features described, or as an alternative to any of the foregoing embodiments, wherein via deformation of the flexible inner wall, a throat area of the inner passageway closes or opens.

In addition to one or more of the features described, or as an alternative to any of the foregoing embodiments, an outer surface of the flexible inner wall includes a plurality of scales or plates.

In addition to one or more of the features described, or as an alternative to any of the foregoing embodiments, the flexible inner wall is fabricated from a wear resistant flexible material having embedded or molded-in reinforcing fibers.

The present disclosure provides for a method for utilizing a nozzle assembly including providing an outer wall and a flexible inner wall defining an enclosed cavity between the outer wall and the flexible inner wall; positioning a portal of the outer wall for inputting or outputting magnetic fluid to or from the enclosed cavity; inputting the magnetic fluid to the enclosed cavity via the portal; positioning two magnet members proximal to an inner passageway of the nozzle assembly; wherein when geometric variation of the inner passageway is desired, turning off or reducing a magnetic field of the two magnet members, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway.

In addition to one or more of the features described, or as an alternative to any of the foregoing embodiments, the magnetic fluid comprises at least one of ferromagnetic fluid, magnetorheological fluid, non-Newtonian magnetic fluid, or a general viscous magnetic fluid; and the flexible inner wall is fabricated from an elastic material, and wherein the flexible inner wall has a variable thickness along a length of the flexible inner wall.

The above described and other features are exemplified by the following figures and detailed description.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
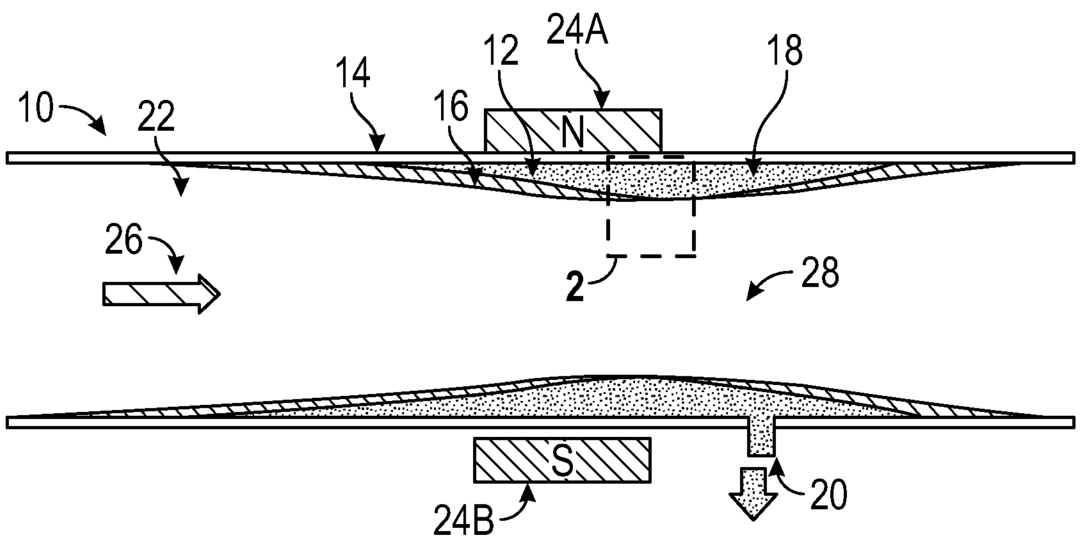
Figure 2:
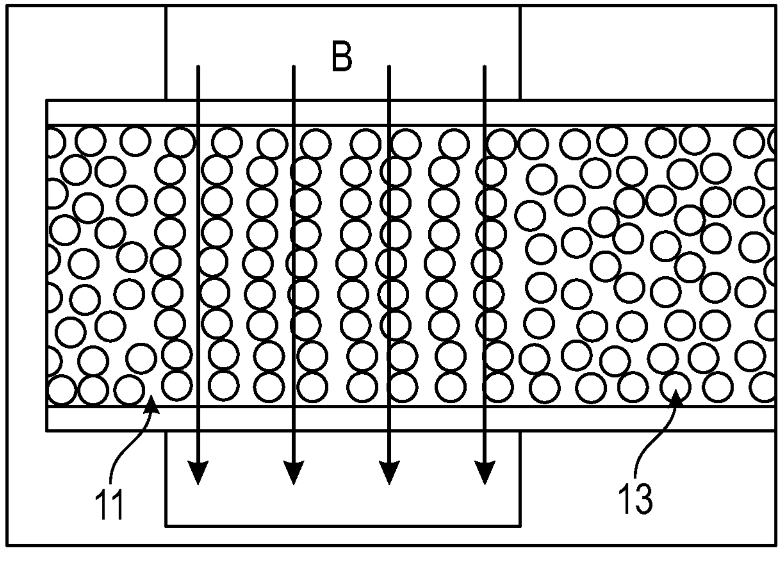
Figure 3:
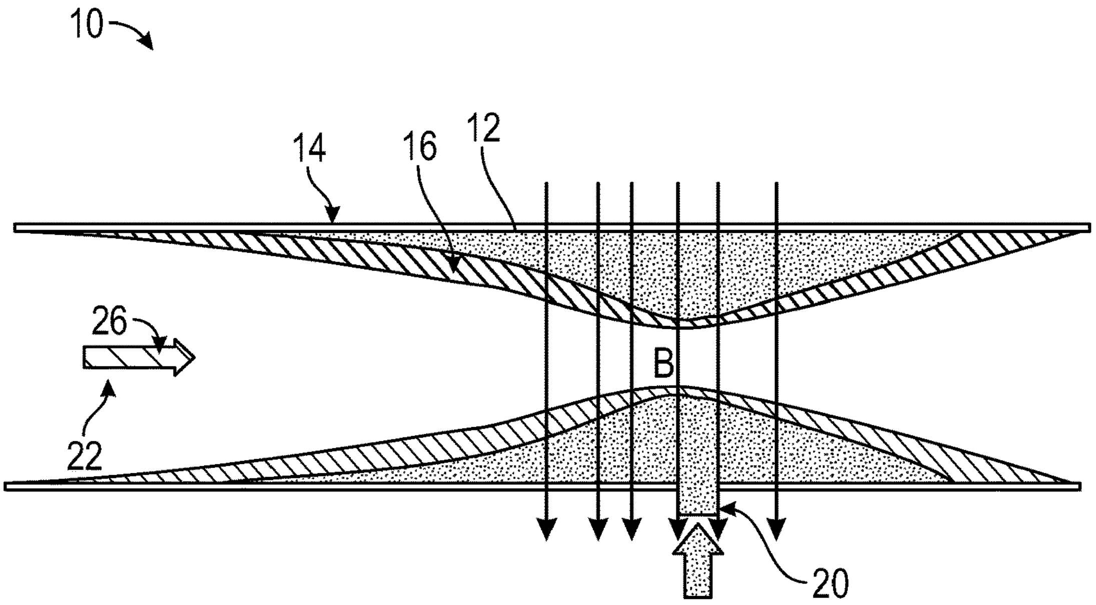
Figure 4:
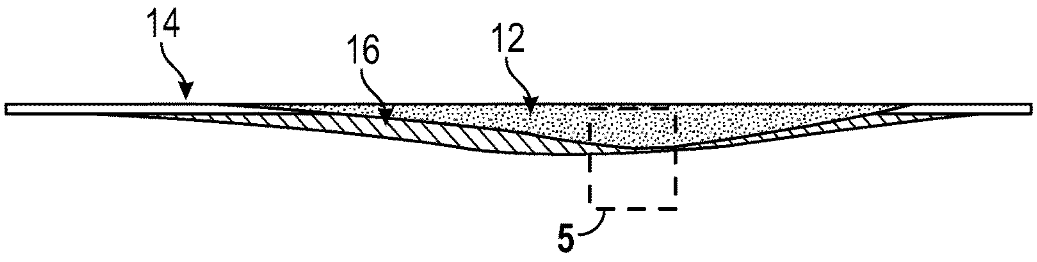
Figure 5:
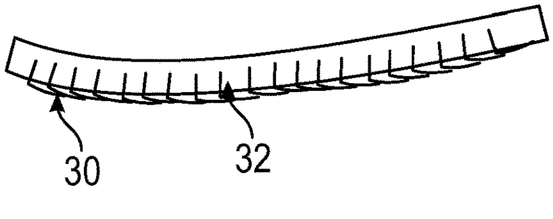
Figure 6:
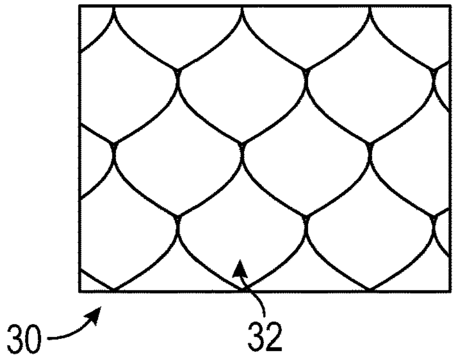
Figure 7:
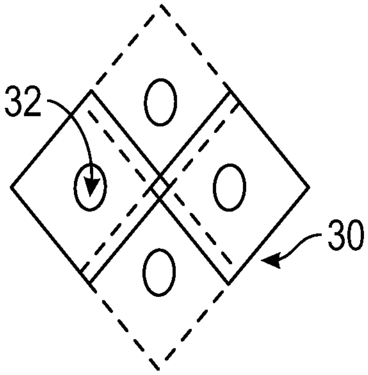
Figure 8:
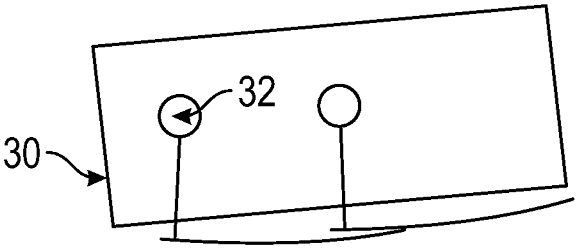
Figure 9:
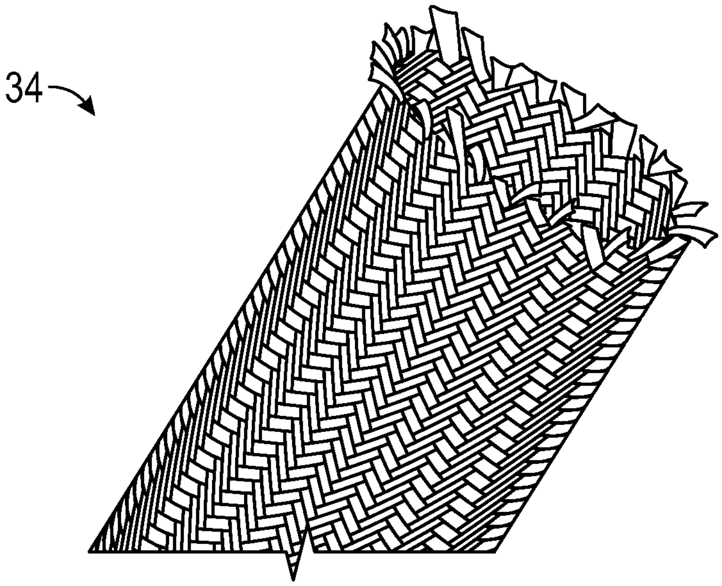
Figure 10:
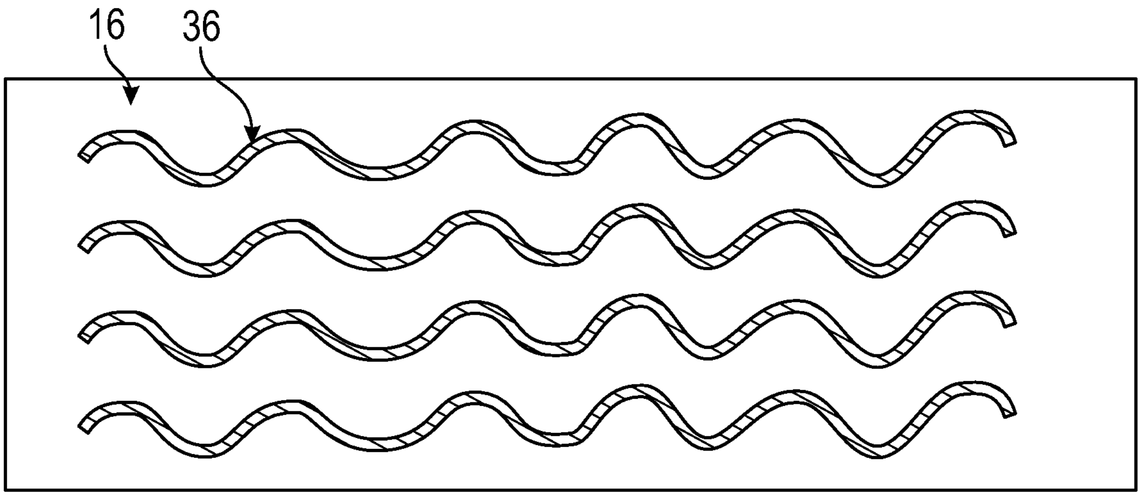
Figure 11:
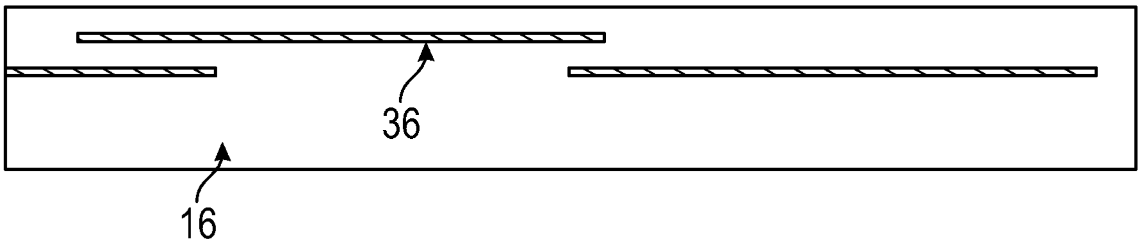
Figure 12:
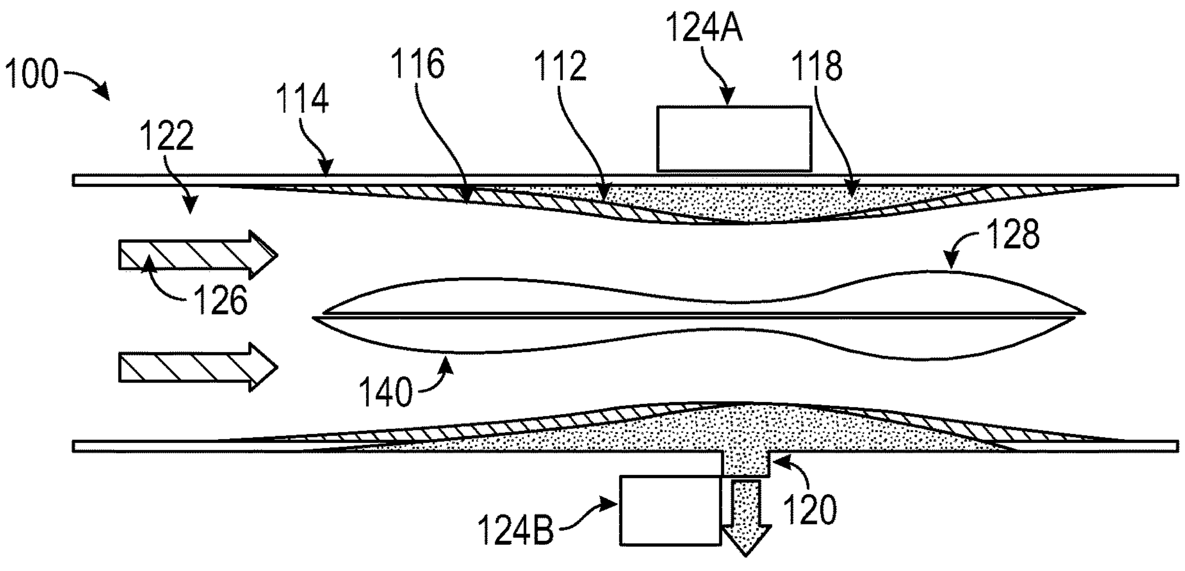
Figure 13:
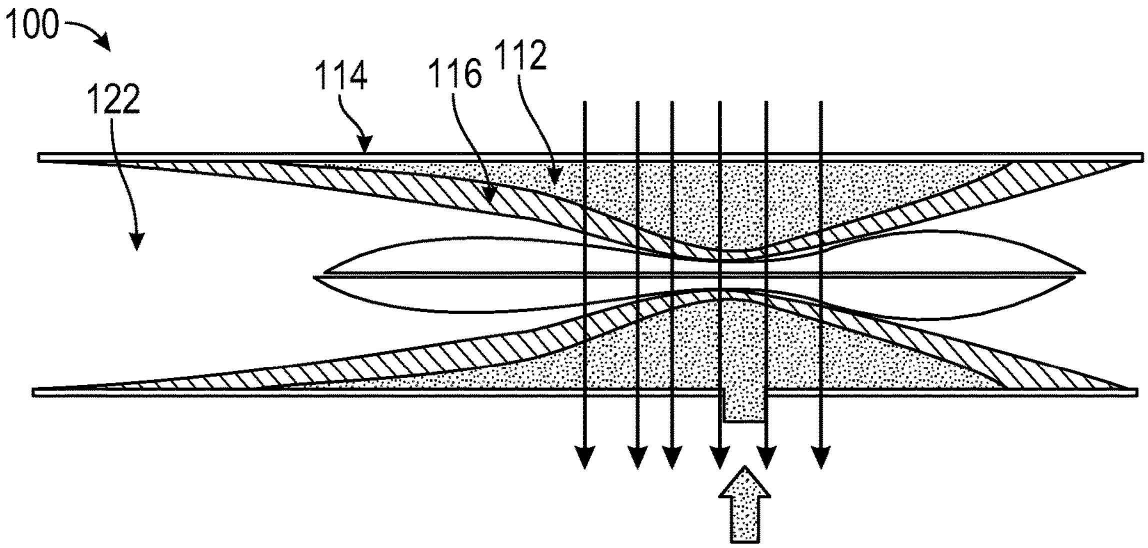
Figure 14:
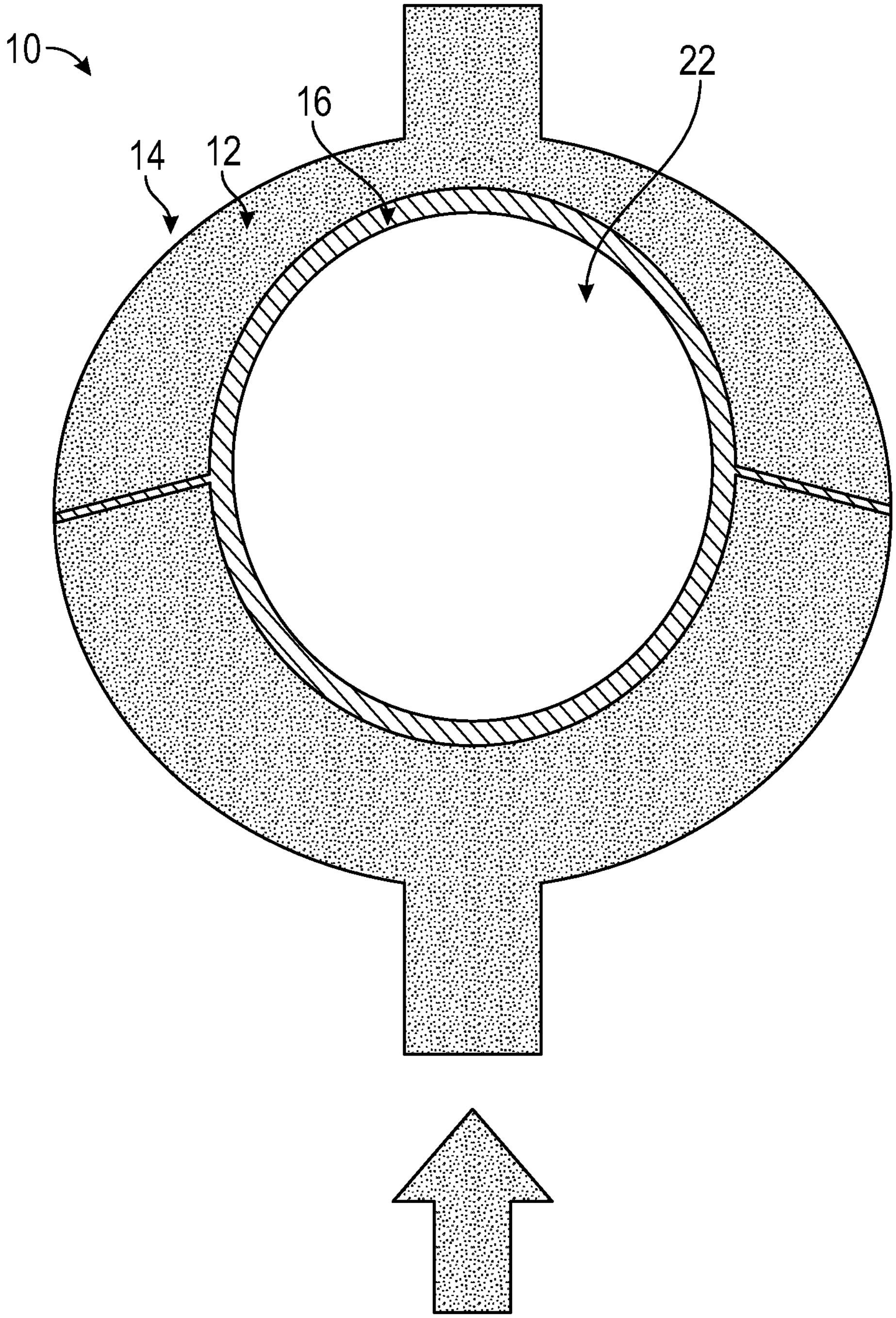

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a cross-sectional side view of an example nozzle assembly, according to the present disclosure;

FIG. 2 is a close-up view of area A of FIG. 1;

FIG. 3 is a cross-sectional side view of an example nozzle assembly, according to the present disclosure;

FIG. 4 is a partial cross-sectional side view of an example nozzle assembly, according to the present disclosure;

FIG. 5 is a close-up view of area B of FIG. 4;

FIG. 6 is a bottom side perspective view of a portion of the nozzle assembly of FIG. 4;

FIGS. 7-8 are side perspective views of a portion of the nozzle assembly of FIG. 4;

FIG. 9 is a side perspective view of an example flexible cover sleeve, according to the present disclosure;

FIG. 10 is a top view of an example wall of a nozzle assembly, according to the present disclosure;

FIG. 11 is a cross-sectional side view of the wall of FIG. 10;

FIGS. 12-13 are cross-sectional side views of an example valve assembly, according to the present disclosure; and FIG. 14 is a cross-sectional end view of an example nozzle assembly, according to the present disclosure.

DETAILED DESCRIPTION

The example embodiments disclosed herein are illustrative variable geometry nozzle or valve assemblies utilizing magnetic fluid, and systems of the present disclosure and methods/techniques thereof. It should be understood, however, that the disclosed embodiments are merely examples of the present disclosure, which may be embodied in various forms. Therefore, details disclosed herein with reference to example variable geometry nozzle or valve assemblies utilizing magnetic fluid and associated processes/techniques of fabrication/assembly and use are not to be interpreted as limiting, but merely as the basis for teaching one skilled in the art how to make and use the assemblies/systems and/or alternative assemblies/systems of the present disclosure.

The present disclosure provides variable geometry nozzle or valve assemblies utilizing magnetic fluid (e.g., ferromagnetic fluid; magnetorheological fluid; non-Newtonian magnetic fluid; general viscous magnetic fluid).

More particularly, the present disclosure provides variable geometry nozzle or valve assemblies utilizing magnetic fluid for high efficiency expansion and/or mass flow control in fluidic systems (e.g., gas injectors; micro-satellite propulsion systems; gas burners; fluid injectors; etc.).

FIG. 1 is a cross-sectional side view of an example nozzle assembly 10, according to certain embodiments of the present disclosure. In general, example nozzle assembly 10 is a variable geometry nozzle assembly that utilizes magnetic fluid 12 for high efficiency expansion and/or mass flow control in fluidic systems, as discussed further below.

In example embodiments, nozzle assembly 10 includes an outer wall 14 (e.g., cylindrical outer wall 14), and an inner wall 16. It is noted that example inner wall 16 can be fabricated from elastic material or the like, and inner wall 16 can have variable thickness along the length of the inner wall 16.

In general, the outer wall 14 and the inner wall 16 define an enclosed cavity 18 between the outer wall 14 and the inner wall 16. Example outer wall 14 includes at least one portal 20 for input and/or output of magnetic fluid 12 to or from the cavity 18.

In example embodiments, the magnetic fluid 12 is a ferromagnetic fluid (FF) or magnetorheological fluid (MR fluid) 12. In general, ferromagnetic and magnetorheological fluids 12 are colloidal liquids made of micro and/or nanoscale ferromagnetic or ferrimagnetic particles 13 suspended in a carrier fluid 11. Magnetorheological fluids typically have larger particles 13 than ferromagnetic fluids. It is noted that magnetic fluid 12 can also be a non-Newtonian magnetic fluid 12 or a general viscous magnetic fluid 12.

When subjected to a magnetic field, the magnetic fluid 12 greatly increases its apparent viscosity, to the point of becoming a viscoelastic solid. Importantly, the yield stress of the fluid 12 when in its active or on state (e.g., when subjected to a magnetic field) can be controlled very accurately by varying the magnetic field intensity.

As shown in FIG. 1, when geometric variation of the inner passageway 22 of the nozzle assembly 10 is desired or required, the magnetic field of magnet members 24A, 24B positioned proximal to the passageway 22 of the nozzle assembly 10 can be turned off or reduced. The magnetic fluid 12 can be provided (e.g., pumped) into the cavity 18 (e.g., via portal 20).

After providing the magnetic fluid 12 into the cavity 18, deformation of the inner wall 16 (e.g., inner elastic wall 16 having variable thickness) creates a variable geometry of passageway 22 of the nozzle assembly 10 (e.g., via flow of input fluid 26 to passageway 22). It is noted that a throat area 28 of passageway 22 of the nozzle assembly 10 may close or open smoothly, via deformation of the inner wall 16.

In example embodiments, the magnetic field of magnet members 24A, 24B positioned proximal to the nozzle assembly 10 can be turned on or increased to cause the magnetic fluid 12 in cavity 18 to become a viscoelastic solid. As noted, the yield stress of the fluid 12 when in its active or on state (e.g., when subjected to a magnetic field) can be controlled very accurately by varying the magnetic field intensity.

As such and as shown in FIG. 3, the magnetic field of magnet members 24A, 24B can be turned on or increased to cause the magnetic fluid 12 in cavity 18 to become a viscoelastic solid, thereby allowing the solidified or semi-solidified magnetic fluid 12 to remain in a desired or achieved geometry without surface oscillations of assembly 10.

As shown in FIG. 3, the produced geometry of inner wall 16 can remain smooth, thereby ensuring minimum or decreased flow losses of nozzle assembly 10 (e.g., minimum or decreased flow losses of input fluid 26).

As noted, after achieving a desired or optimum geometry of inner wall 16, the magnetic field of magnet members 24A, 24B can be turned on or increased to cause the magnetic fluid 12 in cavity 18 to become a viscoelastic solid, thereby allowing the solidified or semi-solidified magnetic fluid 12 to remain in the desired or achieved geometry/shape (FIG. 3).

It is noted that when nozzle assembly 10 is utilized for certain clean gas injectors (e.g., satellite propulsors using xenon or the like; $O_2$ injectors; $O_2$-methane burners used in metallurgy/metal cutting), no additional surface protection of inner wall 16 may be required, as the gases in such cases are high purity.

However, in cases when nozzle assembly 10 is utilized for injectors or the like using gases with impurities, then additional surface protection of inner wall 16 may be required.

As such and as shown in FIGS. 5-8, the outer surface 30 of inner wall 16 can be a flexible surface layer 30 having a plurality of scales or plates 32 (e.g., fish-like scales 32), to increase the wear resistance of inner wall 16.

In example embodiments and as shown in FIGS. 5-8, the outer flexible surface 30 of inner wall 16 includes a plurality of abrasion resistant scales or plates 32 embedded into the elastic material of inner wall 16. Such design of scales/plates 32 embedded into the elastic material of inner wall 16 can allow for a combination of a smooth variable surface 30 with high or increased abrasion resistance.

In other embodiments and as shown in FIG. 9, the inner wall 16 can include a flexible cover sleeve 34 fabricated from abrasion-resistant material, with the flexible cover sleeve 34 positioned around or on the inner wall 16, to increase wear resistance of inner wall 16.

In some embodiments and as shown in FIGS. 10-11, the inner wall 16 can be fabricated from a wear resistant flexible material (e.g., rubber; polymeric material; thermoplastic elastomers such as thermoplastic polyurethane; etc.) having embedded or molded-in reinforcing fibers 36 (e.g., synthetic fibers; fiberglass fibers; carbon fibers; abrasive-resistant fibers; etc.). Such wear resistant flexible material is elastic in nature, allowing the plastic to be stretched and flexed easily, while also reinforced with embedded reinforcing fibers 36.

As shown in FIG. 14, it is noted that when nozzle assembly 10 is utilized as a fluidic jet (e.g., for burners or the like), the inner wall 16 can deform non-symmetrically around the passageway 22 of the nozzle assembly 10, thereby allowing a user to steer the jet in different directions.

FIGS. 12-13 are cross-sectional side views of an example valve assembly 100, according to some embodiments of the present disclosure. Similar to nozzle assembly 10 described above, example valve assembly 100 is a variable geometry valve assembly 100 that utilizes magnetic fluid 112 for mass flow control in fluidic systems.

In general, valve assembly 100 includes an outer wall 114 (e.g., cylindrical outer wall 114), and an inner wall 116 (e.g., fabricated from elastic material, and can have variable thickness), with enclosed cavity 118 between the outer wall 114 and the inner wall 116.

As shown in FIGS. 12-13, when geometric variation of the inner passageway 122 of the valve assembly 100 is desired or required, the magnetic field of magnet members 124A, 124B positioned proximal to the valve assembly 100 can be turned off or reduced. The magnetic fluid 112 can be provided (e.g., pumped) into the cavity 118 (e.g., via portal 120).

After providing the magnetic fluid 112 into the cavity 118, deformation of the inner wall 116 creates a variable geometry of passageway 122 of the valve assembly 100 (e.g., via flow of input fluid 126 to passageway 122). It is noted that a throat area 128 of passageway 122 of the valve assembly 100 may close or open smoothly, via deformation of the inner wall 116.

In example embodiments, the magnetic field of magnet members 124A, 124B can be turned on or increased to cause the magnetic fluid 112 in cavity 118 to become a viscoelastic solid. As such and as shown in FIG. 13, the magnetic field of magnet members 124A, 124B can be turned on or increased to cause the magnetic fluid 112 in cavity 118 to become a viscoelastic solid, thereby allowing the solidified or semi-solidified magnetic fluid 112 to remain in a desired or achieved geometry relative to passageway 122 or relative to a valve 140 positioned in the inner passageway 122.

It is noted that flow of fluid through conventional valves can be highly turbulent, which can result in significant energy loss after the valve, thereby making it an inefficient flow regulator. In contrast, example valve assembly 100 allows for an efficient and/or improved flow control rate of fluid 126 through passageway 122 of assembly 100, with minimum or decreased losses.

As noted, after achieving a desired or optimum geometry of inner wall 116, the magnetic field of magnet members 124A, 124B can be turned on or increased to cause the magnetic fluid 112 in cavity 118 to become a viscoelastic solid, thereby allowing the solidified or semi-solidified magnetic fluid 112 to remain in the desired or achieved geometry/shape.

There are many benefits of the assemblies, systems and methods of the present disclosure, including, without limitation: flexible nozzle geometry; the outer and inner walls 14, 16 ensure a smooth variation of the nozzle area and non-oscillatory fixed geometry (e.g., via the ferromagnetic fluid 12 under the magnetic field); the variable nozzle geometry allows mass flow control (e.g., choked operation) and high-efficiency shockless expansion; the fish-scale 32 surface construction expands possible application to non-clean gas environments; and/or the proposed designs may be employed in gas burners, gas injectors, fluids injectors, micro-satellite propulsion; fuel injectors; etc.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A nozzle assembly comprising:

an outer wall and a flexible inner wall defining an enclosed cavity between the outer wall and the flexible inner wall; and a portal of the outer wall for inputting or outputting magnetic fluid to or from the enclosed cavity;

wherein when geometric variation of an inner passageway of the nozzle assembly is desired, a magnetic field of two magnet members positioned proximal to the inner passageway is turned off or reduced, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway.

2. The assembly of claim 1, wherein the magnetic fluid comprises at least one of ferromagnetic fluid, magnetorheological fluid, non-Newtonian magnetic fluid, or a general viscous magnetic fluid.

3. The assembly of claim 1, wherein the flexible inner wall is fabricated from an elastic material, and wherein the flexible inner wall has a variable thickness along a length of the flexible inner wall.

4. The assembly of claim 1, wherein a yield stress of the magnetic fluid is controlled by varying an intensity of the magnetic field.

5. The assembly of claim 1, wherein via deformation of the flexible inner wall, a throat area of the inner passageway closes or opens.

6. The assembly of claim 1, wherein an outer surface of the flexible inner wall includes a plurality of scales or plates.

7. The assembly of claim 6, wherein the plurality of scales or plates are embedded in an elastic material of the flexible inner wall.

8. The assembly of claim 1, wherein the flexible inner wall includes a flexible cover sleeve fabricated from abrasion-resistant material, the flexible cover sleeve positioned around or on the flexible inner wall.

9. The assembly of claim 1, wherein the flexible inner wall is fabricated from a wear resistant flexible material having embedded or molded-in reinforcing fibers.

10. The assembly of claim 1, wherein deformation of the flexible inner wall is non-symmetrically around the inner passageway.

11. The assembly of claim 1, wherein the nozzle assembly is a micro-satellite propulsion assembly.

12. The assembly of claim 1, wherein the nozzle assembly is a fluid injector or a gas burner assembly.

13. A valve assembly comprising:

an outer wall and a flexible inner wall defining an enclosed cavity between the outer wall and the flexible inner wall; and a portal of the outer wall for inputting or outputting magnetic fluid to or from the enclosed cavity;

wherein when geometric variation of an inner passageway of valve assembly is desired, a magnetic field of two magnet members positioned proximal to the inner passageway is turned off or reduced, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway or relative to a valve positioned in the inner passageway.

14. The assembly of claim 13, wherein the magnetic fluid comprises at least one of ferromagnetic fluid, magnetorheological fluid, non-Newtonian magnetic fluid, or a general viscous magnetic fluid.

15. The assembly of claim 13, wherein the flexible inner wall is fabricated from an elastic material, and wherein the flexible inner wall has a variable thickness along a length of the flexible inner wall.

16. The assembly of claim 13, wherein via deformation of the flexible inner wall, a throat area of the inner passageway closes or opens.

17. The assembly of claim 13, wherein an outer surface of the flexible inner wall includes a plurality of scales or plates.

18. The assembly of claim 13, wherein the flexible inner wall is fabricated from a wear resistant flexible material having embedded or molded-in reinforcing fibers.

19. A method for utilizing a nozzle assembly comprising:

providing an outer wall and a flexible inner wall defining an enclosed cavity between the outer wall and the flexible inner wall;

positioning a portal of the outer wall for inputting or outputting magnetic fluid to or from the enclosed cavity;

inputting the magnetic fluid to the enclosed cavity via the portal; and positioning two magnet members proximal to an inner passageway of the nozzle assembly;

wherein when geometric variation of the inner passageway is desired, turning off or reducing a magnetic field of the two magnet members, thereby allowing deformation of the flexible inner wall to create a variable geometry of the inner passageway via flow of input fluid to the inner passageway; and wherein when the magnetic field of the two magnet members is turned on or increased, the magnetic fluid becomes a viscoelastic solid or semi-solid, thereby allowing the solidified or semi-solidified magnetic fluid to remain in a desired or achieved geometry relative to the inner passageway.

20. The method of claim 19, wherein the magnetic fluid comprises at least one of ferromagnetic fluid, magnetorheological fluid, non-Newtonian magnetic fluid, or a general viscous magnetic fluid; and wherein the flexible inner wall is fabricated from an elastic material, and wherein the flexible inner wall has a variable thickness along a length of the flexible inner wall.

* * * * *